(12) United States Patent
Mieglitz et al.

(10) Patent No.: US 8,656,646 B2
(45) Date of Patent: Feb. 25, 2014

(54) VEHICLE DOOR

(75) Inventors: Hans-Joachim Mieglitz, Monhiem (DE); Thorsten Meyer, Krefeld (DE); Alexander Schidan, Solingen (DE)

(73) Assignee: Johnson Controls Interiors GmbH & Co KG, Grefrath (DE)

( * ) Notice: Subject to any disclaimer, the term of this patent is extended or adjusted under 35 U.S.C. 154(b) by 250 days.

(21) Appl. No.: 12/305,355

(22) PCT Filed: Jun. 20, 2007

(86) PCT No.: PCT/EP2007/005410
§ 371 (c)(1),
(2), (4) Date: May 6, 2009

(87) PCT Pub. No.: WO2007/147570
PCT Pub. Date: Dec. 27, 2007

(65) Prior Publication Data
US 2009/0313903 A1    Dec. 24, 2009

(30) Foreign Application Priority Data
Jun. 22, 2006 (DE) .......................... 10 2006 029 112

(51) Int. Cl.
*B60J 5/04* (2006.01)
(52) U.S. Cl.
USPC .......................... 49/502; 49/498.1; 296/146.7
(58) Field of Classification Search
USPC ................................ 49/502, 498.1; 296/146.7
See application file for complete search history.

(56) References Cited

U.S. PATENT DOCUMENTS

| | | | | |
|---|---|---|---|---|
| 5,581,951 A * | 12/1996 | Ryan et al. | ................... | 49/498.1 |
| 6,422,640 B2 * | 7/2002 | Whitehead et al. | ........ | 296/146.7 |
| 6,676,195 B1 * | 1/2004 | Marriott et al. | ............ | 296/146.7 |
| 6,898,901 B2 * | 5/2005 | Petroski et al. | ................. | 49/502 |
| 6,966,594 B2 * | 11/2005 | Wojewnik | .................... | 296/39.3 |
| 7,055,887 B2 * | 6/2006 | Williams et al. | ........... | 296/146.7 |

(Continued)

FOREIGN PATENT DOCUMENTS

DE    101 35 848 A1    2/2003

(Continued)

OTHER PUBLICATIONS

International Search Report from PCT/EP2007/005410.

(Continued)

*Primary Examiner* — Jerry Redman
(74) *Attorney, Agent, or Firm* — Foley & Lardner LLP

(57) ABSTRACT

A vehicle door includes a vehicle bodywork and a door lining. The vehicle door has a sealing region between the vehicle bodywork and the door lining. The door lining is mounted on the vehicle bodywork by means of attachment elements which can be moved in a mounting direction in order to bring about attachment. In the sealing region, a sealing profile is provided which is provided in a seal-forming fashion via a contact pressure force after the sealing profile has been brought to bear either against the vehicle bodywork or against the door lining. The sealing profile is provided in such a way that the contact pressure force is provided rising monotonously over a contact pressure distance which runs parallel to the mounting direction and with a positive gradient of less than approximately 5 Newton per millimeter contact pressure distance and a length of extension of the sealing profile per centimeter.

15 Claims, 4 Drawing Sheets

(56) References Cited

U.S. PATENT DOCUMENTS

| | | | |
|---|---|---|---|
| 7,059,659 B2* | 6/2006 | Smith et al. | 296/146.7 |
| 7,291,378 B2* | 11/2007 | Cowelchuk et al. | 428/140 |
| 7,364,218 B2* | 4/2008 | Radu et al. | 296/146.7 |
| 7,670,671 B2* | 3/2010 | Russell et al. | 428/172 |
| 2001/0030444 A1* | 10/2001 | Whitehead et al. | 296/146.7 |
| 2003/0019161 A1* | 1/2003 | Dawson | 49/502 |
| 2003/0097797 A1* | 5/2003 | Cucchiara et al. | 49/502 |
| 2005/0184555 A1* | 8/2005 | Williams et al. | 296/146.7 |
| 2005/0235574 A1* | 10/2005 | Gomez Camara et al. | 49/502 |
| 2005/0248181 A1* | 11/2005 | Bigelow | 296/146.7 |
| 2006/0017306 A1* | 1/2006 | Smith et al. | 296/146.7 |
| 2007/0125003 A1 | 6/2007 | Wartzack et al. | |
| 2007/0256366 A1* | 11/2007 | Kwasnik et al. | 49/498.1 |
| 2008/0295415 A1* | 12/2008 | Mieglitz et al. | 49/502 |

FOREIGN PATENT DOCUMENTS

| | | |
|---|---|---|
| DE | 103 34 143 A1 | 2/2004 |
| DE | 103 03 387 B4 | 6/2005 |
| DE | 10 2004 053610 A1 | 5/2006 |
| DE | 10 2004 053636 A1 | 5/2006 |
| JP | 01101267 A * | 4/1989 |
| JP | 2003-072381 A | 3/2003 |
| JP | 2005-178717 A | 7/2005 |
| WO | WO 2004/108451 A | 12/2004 |

OTHER PUBLICATIONS

Japanese Office Action for Japanese Patent Application No. JP 2009-51560, dated May 29, 2012, with English translation.

European examination report received in connection with European application No. 07764733.7; dated Jan. 15, 2013.

Japanese Office Action for Japanese Patent Application No. JP 2009-515760 dated Jun. 4, 2013.

* cited by examiner

VEHICLE DOOR

BACKGROUND

The present invention relates to a vehicle door comprising a body and a door lining, the vehicle door comprising a sealing region between the body and the door lining, the door lining being fastened to the body by means of fastening elements to be moved in a mounting direction for fastening.

Such vehicle doors are, for example, known from DE 101 35 848 A1. According to this known arrangement of a vehicle door, it is provided that a seal produces sealing between a body and a door lining by means of a specific contact pressure force, this contact pressure force having to be precisely adjusted by means of specific measures in order to ensure a certain degree of sealing. However, such measures themselves are not able to ensure the required sealing between the body and the door lining to a sufficient degree. Moreover, from DE 103 03 387 B4 it is known to seal a door sheet against a door lining facing the passenger compartment in the mounted state, by a peripheral magnetic sealing profile being provided. It is a drawback here that such a sealing profile is firstly associated with high costs and with high weight, and secondly may not be used universally, as a magnetizable counter element is required (which for example is not the case in an aluminum body). Moreover, it is a drawback here that a secure seal is only provided between the body and the door lining when relatively low production tolerances are maintained, which considerably increases the manufacturing complexity and thus the cost.

It was, therefore, the object of the present invention to provide a vehicle door which does not have the drawbacks of the prior art.

SUMMARY

This object is achieved by a vehicle door comprising a body and a door lining, the vehicle door comprising a sealing region between the body and the door lining, the door lining being fastened to the body by means of fastening elements to be moved in a mounting direction for fastening, a sealing profile being provided in the sealing region which is sealingly provided by a contact pressure force after the sealing profile has been brought to bear either against the body or against the door lining, the sealing profile being provided such that the contact pressure force is provided rising monotonously over a contact pressure distance extending parallel to the mounting direction and with a gradient of approximately the same as, or less than, approximately 1 newton per millimeter of the contact pressure distance and per centimeter of the sealing profile longitudinal extension.

The vehicle door according to the invention has the advantage that, at a relatively low cost, excellent sealing may be achieved between the body and the door lining. It is quite particularly advantageous that the sealing profile of the present invention allows tolerance compensation so that the tolerance requirements of the relevant components, i.e. in particular the body and the door lining, may be lower than in hitherto known sealing mechanisms. This means that the tolerances of the components to be fastened to one another may be greater and thus cost-effective production is possible.

A further advantage according to the present invention is that a manual assembly, which is relatively simple and easy to carry out, is possible by means of clips and/or fastening elements engaging between the door lining and the body. In this connection it is necessary that the fastening elements, in spite of easier and more rapid mounting, on the one hand, have to hold the door lining securely in all possible situations of use, i.e. must have sufficient fastening force, but on the other hand also have to allow a reversible fastening of the door lining to the body, in particular in the event, for example, of repairs in the internal space between the body and the door lining. In this case, the contact pressure force of the sealing region and/or of the sealing profile generally acts between the door lining and the body as a counter force to the holding force of the fastening elements, and thus the reliability of the fastening tends to be reduced. Thus the possible contact pressure forces to be created for producing the required seal between the body and the door lining are limited.

According to the present invention, it is particularly preferred if the contact pressure force is provided over the contact pressure distance with a gradient of approximately the same or less than approximately 0.8 newtons per millimeter of the contact pressure distance and per centimeter of the sealing profile longitudinal extension, preferably approximately the same or less than approximately 0.6 newtons per millimeter of the contact pressure distance and per centimeter of the sealing profile longitudinal extension, particularly preferably approximately the same or less than approximately 0.4 newtons per millimeter of the contact pressure distance and per centimeter of the sealing profile longitudinal extension. As a result, in a particular manner a good seal may be achieved, on the one hand, between the door lining and the body and, on the other hand, it is possible for the holding force of the fastening elements to be reduced as little as possible.

Furthermore, according to the present invention it is preferred that the door lining is provided fastened to the body substantially along the sealing region by means of fastening elements, the fastening elements exerting the contact pressure force. As a result, a particularly good seal may be achieved as the fastening elements are provided in the region of the sealing region.

According to the invention, it is further preferred that the contact pressure force constitutes a maximum of approximately 60% of the holding force of the fastening elements, preferably constitutes a maximum of approximately 40% of the holding force of the fastening elements, particularly preferably constitutes a maximum of approximately 35% of the holding force of the fastening elements. As a result, it is possible to mount the door lining on the body in a simple and easy manner, and a reliable fastening of the door lining to the body and an excellent seal therebetween may be effected in an efficient manner.

According to the invention, it is further preferred that the contact pressure distance is approximately 2 millimeters to approximately 30 millimeters, preferably approximately 4 millimeters to approximately 30 millimeters, particularly preferably approximately 6 millimeters to approximately 30 millimeters, quite particularly preferably approximately 8 millimeters to approximately 30 millimeters. As a result, according to the invention it is possible to a quite specific degree to produce a seal which is easy to mount and compensates for tolerances between the door lining and the body and which, moreover, is designed to be relatively easy to produce and cost-effective.

According to a particularly preferred embodiment of the present invention, the sealing profile is configured as a hollow profile. As a result, a high sealing effect may be achieved in a particularly simple and reliable manner in the sealing region between the body and the door lining, as by means of relatively low contact pressure forces a defined sealing effect as well as a relatively large contact pressure distance may be achieved in a simple manner. This is, in particular, due to the fact that with a hollow profile as a seal, after the sealing profile has been brought to bear against the counter face to be sealed, a compression and/or a deformation of the sealing profile is possible which allows a particularly large spring path with a very defined force path. This is, in particular, the case as the resilient material of such a sealing profile in the case of a hollow profile (in the range of the small spring constant) is not compressed or at least not substantially compressed but merely bent. As an alternative to a hollow profile, however, it is also possible according to the invention that for example an angled profile (L-shaped or even V-shaped) or even a two-component solid profile may be used, which fulfils the appropriate requirements, in particular, of a flat spring characteristic curve (in at least one partial region).

According to the invention, it is further preferred if the sealing profile has at least one sealing lip. As a result, the sealing effect of the sealing profile may be improved to a specific degree and at a low cost.

Moreover, it is preferably provided according to the invention that the sealing region is provided substantially in the outer region of the door lining, substantially entirely peripherally. As a result, a particularly large region of the door lining may be produced as a so-called dry space from a wet space facing the body. Alternatively, it may also be preferred that the sealing region merely encompasses a relatively small partial region of the door lining. This is, in particular, when the body only has a small opening region and/or a small region of openings in the direction of the door lining.

According to a preferred embodiment of the invention the door lining has a separating means, the separating means dividing an internal space of the vehicle door into a wet space facing the body and a dry space facing the door lining, the separating means being clamped between the body and the door lining element, in particular inside the sealing region. As a result, it is possible in a particularly advantageous manner to provide between the door lining element and the separating means a relatively large dry space for arranging such components which have to be protected from moisture and damp.

BRIEF DESCRIPTION OF THE DRAWINGS

The invention is described hereinafter with reference to FIGS. 1 to 5. These explanations are merely provided by way of example and do not limit the general inventive idea.

DETAILED DESCRIPTION

Figure 1:
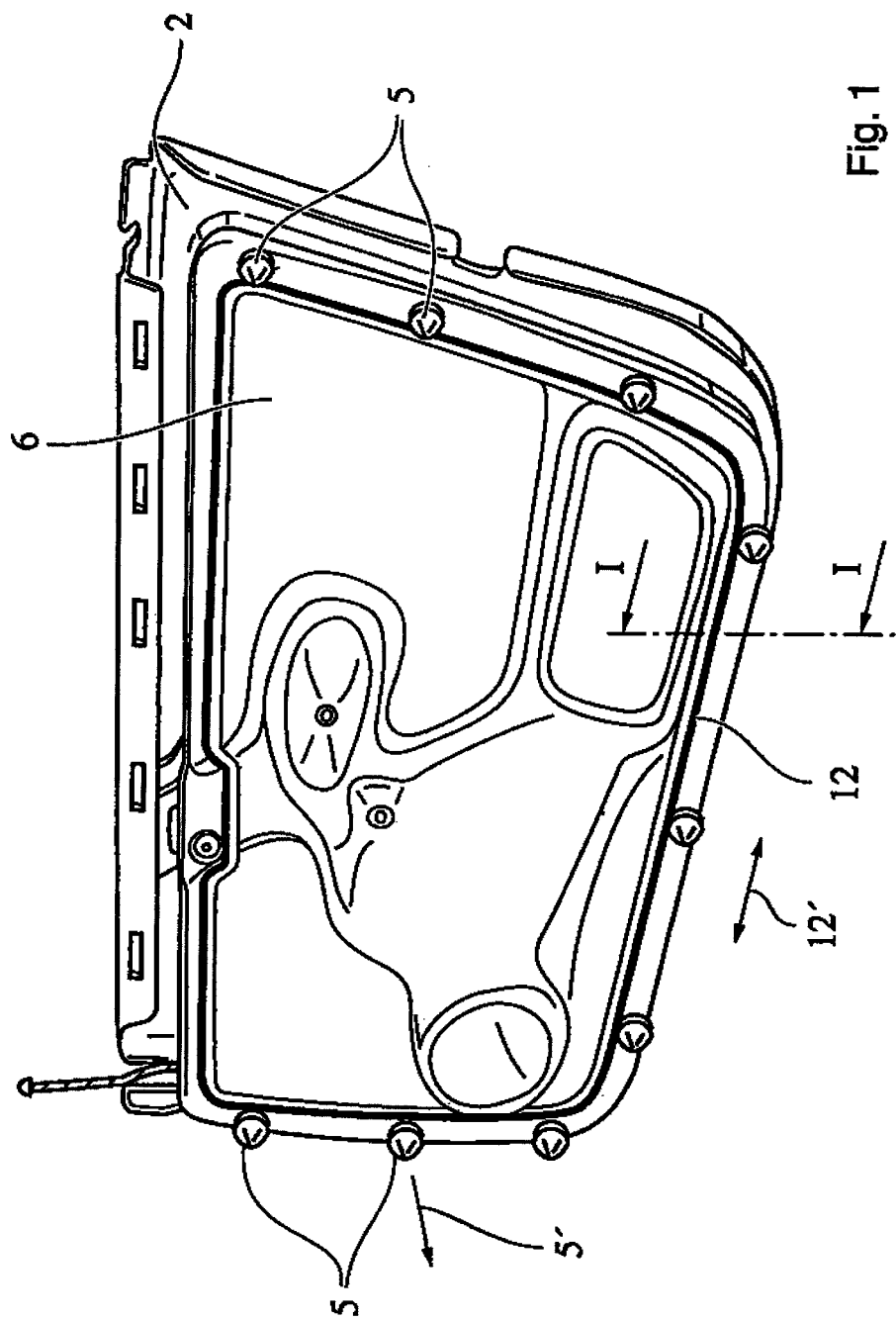
FIG. 1 shows a vehicle door lining viewed from the inside.
Figure 3:
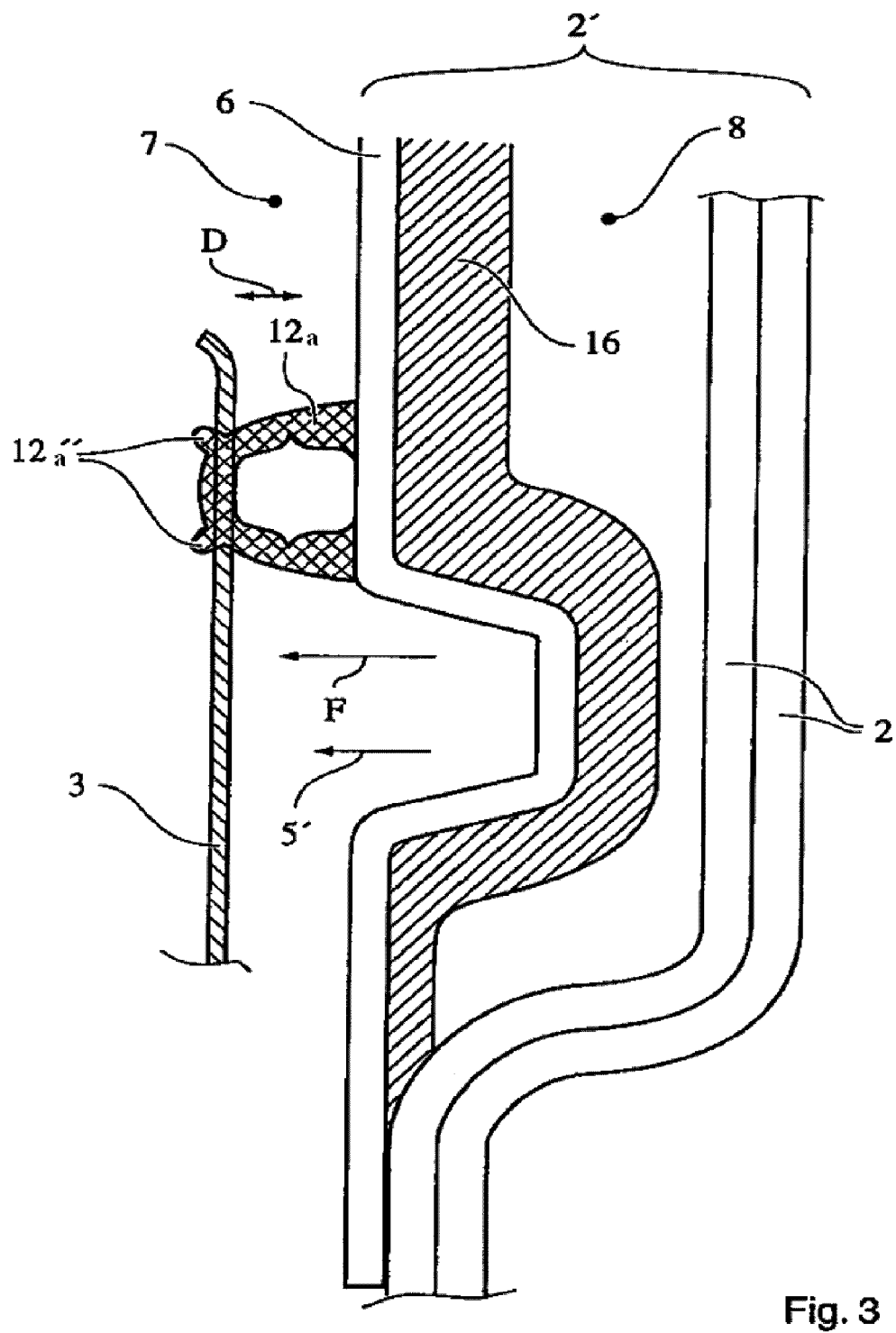

In FIG. 1, the inner face of a door lining 2' of a vehicle door 1 according to the invention is shown (illustrated in FIG. 1 without a body 3). For example, the door lining 2' has a door lining element 2 and a separating means 6 in the form, in particular, of an inherently rigid sealing plane. These separating means 6, as an inherently rigid sealing plane, may, for example, be a deep-drawn polypropylene plate. However, flexible separating means 6 may also be used, for example, as a sealing film or the like. It is important that the separating means 6 are at least substantially waterproof and vaporproof, so that substantially all continuous plastics materials such as a plastics film and a plastics foam mat are considered. This preassembled sub-assembly consisting of the door lining element 2 and the preassembled separating means 6 is connected in a subsequent step to the body 3 (not shown in FIG. 1) of the vehicle door 1. Hereinafter, this entire sub-assembly consisting of the door lining element 2 and the separating means 6 is denoted as a door lining 2'. An internal space between the body 3 and the door lining element 2 is divided or separated via the separating means 6 into a dry space and a wet space, so that in particular electrical and/or electronic components and units may be protected in the dry space from water and/or from vapor. A sealing profile 12 and/or a seal profile 12 is shown on the periphery of the sealing region 14, which has a longitudinal extension 12' parallel to its local axis of extension. The sealing profile longitudinal extension 12' is, for example, illustrated below the vehicle door 1. A plurality of fastening elements 5 for fastening the door lining 2' to the body 3 are shown in FIG. 3. These fastening elements 5 respectively have a mounting direction 5' according to which the door lining 2' has to be moved relative to the body 3, in order to produce a fastening. In particular, the fastening elements are latching elements, such as for example clips. As an alternative to the embodiment shown in FIG. 1, according to the invention it may also be provided that no separating means 6 are present and the sealing profile 12 is directly fastened to the door lining element 2 and after mounting sealed in the direction of the body 3.

Figure 2:
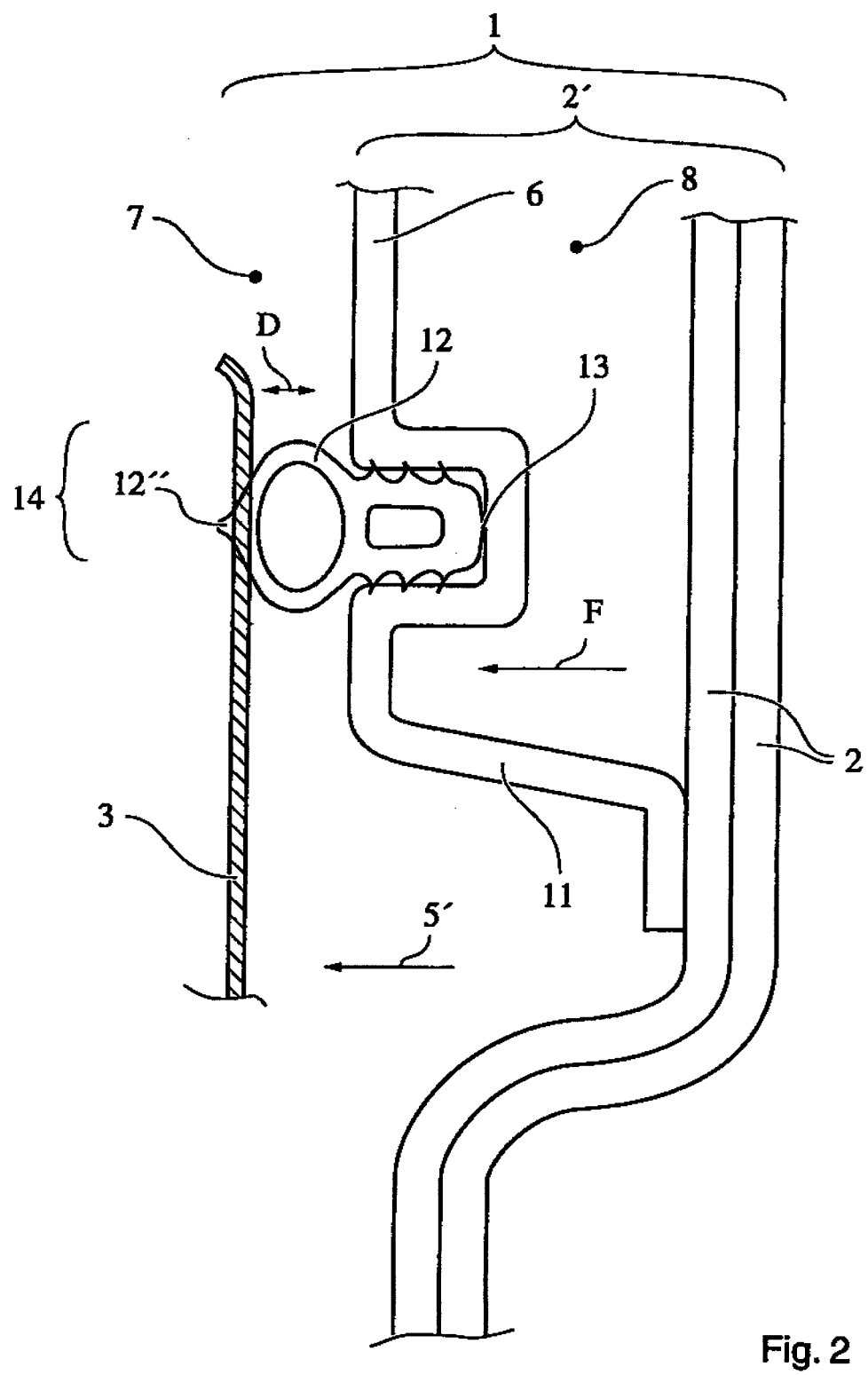
FIGS. 2 and 3 show the vehicle door lining and the associated body in section according to two embodiments.

Schematically represented cross sections, in particular of a sealing region between the body 3 and the door lining 2', are respectively shown in FIGS. 2 and 3. The region 7 of the wet space between the door lining 2' and the body 3 as well as the dry space 8 between the separating means 6 and the door lining element 2 are visible both from FIG. 2 and also from FIG. 3. The sealing region 14 is provided in the region of a sealing profile 12 (shown as a sealing profile 12 in FIG. 2 and 12a in FIG. 3), by means of the fastening elements 5 only shown in FIG. 1, which are in particular configured as latching elements such as for example clips or the like, the door lining 2' being pressed by the contact pressure force F onto the body 3. In this case, the sealing profile 12, after the sealing profile 12 has been brought to bear against the body 3, is spring-loaded over a contact pressure distance D, so that tolerance compensation is produced. According to the invention, it may preferably be provided that the sealing profile 12 has sealing lips 12" (shown as sealing lips 12" in FIG. 2 and 12a" in FIG. 3), so that an improved sealing effect is achieved. Optionally, it is possible (see FIG. 2) that a pressure rib 11 is provided in the region of the separating means 6. Moreover, it may be optionally provided (see FIG. 3) that an acoustic absorber 16 or other compensation layer is arranged, in particular, on the side of the separating means 6 facing the door lining element 2.

With regard to the fastening of the sealing profile 12 to the door lining 2' it may be either provided that the sealing profile 12 is directly arranged on the door lining element 2 (not shown) or, however, it is possible that the sealing profile 12 is inserted and/or clamped in a groove 13 of the separating means 6 and is fastened thereby (see FIG. 2) or, however, it is possible that the sealing profile 12 is mounted on the separating means 6, in a preferred manner the sealing profile 12 being directly extruded in one operation onto the separating means 6, for example, during the extrusion process in a single process step a material connection being made with the substrate of the separating means 6 which leads to a further cost saving. Naturally, however, the sealing profile 12 may also be connected to the separating means 6 by means of, for example, a bonded connection or the like. Both when extruding the sealing profile 12 onto the separating means 6 and also when bonding to one another it is preferred according to the invention to provide materials made of the same material family for the sealing profile 12 and the separating means 6, for example from the polyolefin family or the polyurethane family.

Figure 4:
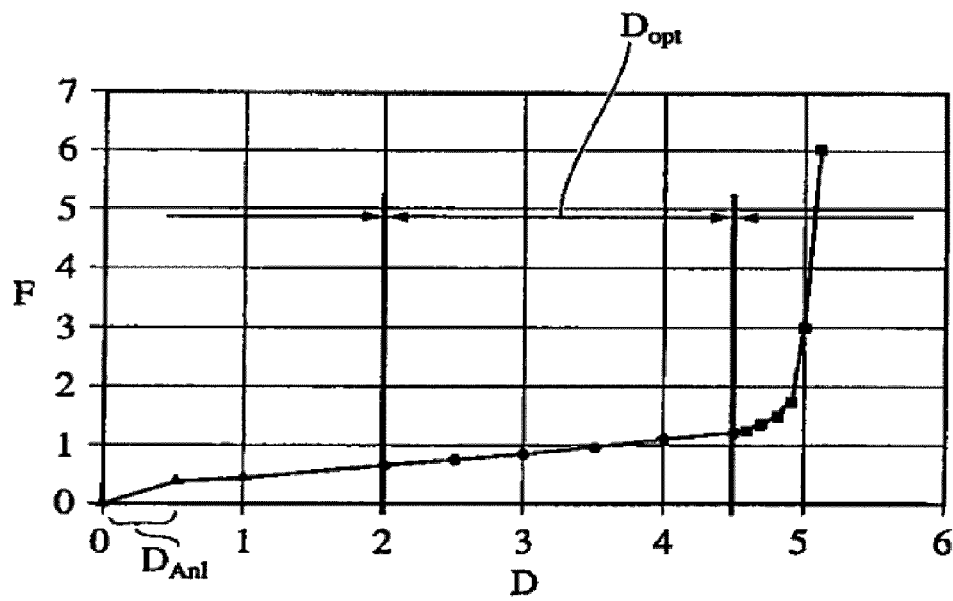
FIG. 4 shows a schematic view of the path of the contact pressure force over the contact pressure distance for mounting the door lining on the body and, in particular, the path of the contact pressure force over the contact pressure distance.

It is essential within the meaning of the present invention that the sealing profile 12 is designed such that a relatively flat force path of the contact pressure force F is present over the contact pressure distance D. This is shown schematically in FIG. 4. FIG. 4 shows the force path of the contact pressure force F over the contact pressure distance D during the mounting of the door lining 2' provided with the sealing profile 12. In this case, a contact pressure distance D of zero is intended to correspond exactly to the sealing profile 12 bearing against the body 3. By pressing the door lining 2', together with the sealing profile 12, further against the body 3 (thereby increasing the contact pressure distance D) there is initially a slight increase in the contact pressure force F, so that a sealing effect is produced via, for example, a slight deformation of possibly present sealing lips 12" on the sealing profile 12. In a central and/or optimal region denoted by $D_{opt}$, the contact pressure force F increases merely with a very slight gradient, depending on the contact pressure distance D. However, the sealing effect of the sealing profile 12 is obtained over the entire contact pressure distance D (apart from merely the very first region, denoted in FIG. 4 by the reference numeral $D_{An1}$, directly after the sealing profile 12 has been brought to bear, namely in the range of approximately 0 to approximately 0.5 millimeters and/or in the range of approximately 0 to approximately 1 millimeter). As a result, it is possible according to the invention to ensure tolerance compensation for production tolerances, for example, of the dimensions of the elements to be connected to one another.

Moreover, as a result it is also possible to compensate for possible vibrations or pressure fluctuations which occur during the operation of the vehicle door, and nevertheless to maintain a sufficient sealing effect. By pressing the door lining 2' further against the body 3 after the end of the contact pressure distance D there is a relatively strong increase in the contact pressure force F which, in particular, is associated with the fact that the sealing profile 12 is substantially fully compressed and from now on deformation does not occur by distortion of the sealing material but by compression of the sealing material of the sealing profile 12. According to the invention, the entry of the sealing profile 12 into this region is intended to be hindered at least over the majority of the length of the sealing profile 12, in order to limit the resulting contact pressure force F.

Figure 5:
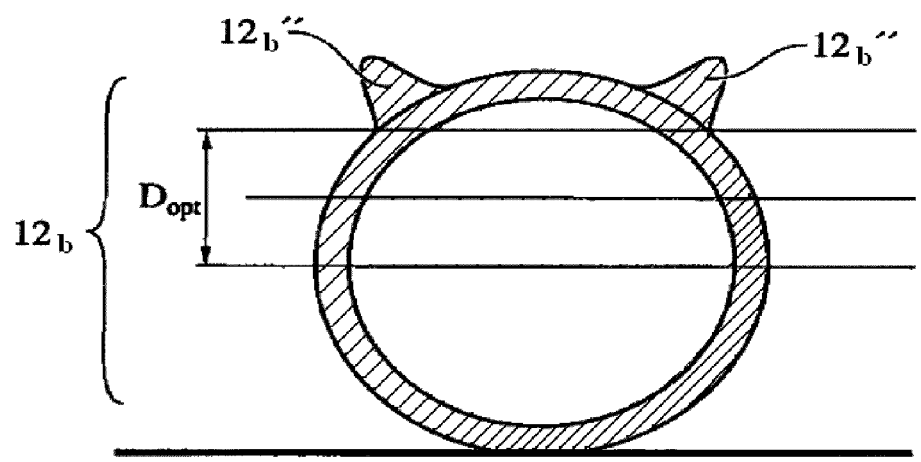
FIG. 5 shows in a schematic representation an embodiment of the sealing profile by way of example in a side view.

In FIG. 5, an embodiment of the sealing profile 12 (shown as a sealing profile 12b) is shown by way of example, two sealing lips 12" being denoted by the reference numeral 12b", and the region of the optimal distance $D_{opt}$ being illustrated schematically, the thick line illustrated in the center of this region representing the desired position of the deformation of the sealing profile 12, whilst the remaining region of the contact pressure distance D provides the width of the tolerance range.

The numerical values according to FIG. 4 are provided for the example of a part of the sealing profile 12 which is one centimeter long. This is based on a gradient of the contact pressure force over the contact pressure distance D of approximately less than or approximately the same as one newton per millimeter of the contact pressure distance D and per centimeter of the sealing profile longitudinal extension 12'. Preferably, the gradient of the contact pressure force is slightly less than or approximately the same as 0.8 newtons per millimeter of the contact pressure distance D and per centimeter of the sealing profile longitudinal extension 12', particularly preferred is a gradient of less than or approximately the same as 0.6 newtons per millimeter of the contact pressure distance D and per centimeter of the sealing profile longitudinal extension 12' and quite particularly preferred is a gradient of less than or approximately the same as 0.4 newtons per millimeter of the contact pressure distance D and per centimeter of the sealing profile longitudinal extension 12'. In particular, the compression force i.e. the contact pressure force F to be exerted over the entire sealing profile longitudinal extension 12' has to be applied by the holding force of generally a plurality of fastening elements 5. In this case, a holding force per fastening element of approximately 50 to 100 newtons, in particular for example 60 newtons or less, is provided and it is provided that the fastening elements 5 are arranged approximately every 50 millimeters to 500 millimeters, preferably approximately every 100 millimeters to 300 millimeters, particularly preferably approximately every 200 millimeters, along the sealing profile longitudinal extension 12'.

LIST OF REFERENCE NUMERALS

1 Vehicle door
2 Door lining element
2' Door lining
3 Body
5 Fastening element
5' Mounting direction
6 Separating means
7 Wet space
8 Dry space
11 Pressure rib
12 Sealing profile
12' Sealing profile longitudinal extension
12" Sealing lip
13 Groove
14 Sealing region
16 Acoustic absorber
D Contact pressure distance
F Contact pressure force

The invention claimed is:
1. A vehicle door comprising:
   a body;
   a door lining fastened to the body by fastening elements configured to move in a mounting direction for fastening; and
   a sealing region provided between the body and the door lining;
   wherein a sealing profile is provided in the sealing region which is sealingly provided by a substantially balanced contact pressure force after the sealing profile has been brought to bear either against the body or against the door lining, the sealing profile being provided such that the contact pressure force is provided rising monotonously over a contact pressure distance extending parallel to the mounting direction and with a gradient of less than approximately 1 newton per millimeter of the contact pressure distance and per centimeter of the sealing profile longitudinal extension;
   wherein the sealing profile is a two-component solid profile; and
   wherein the door lining is provided fastened to the body substantially along the sealing region by means of the fastening elements, the fastening elements exerting the contact pressure force.

2. The vehicle door as claimed in claim 1, wherein the sealing profile is provided such that the contact pressure force is provided over the contact pressure distance with a gradient of less than approximately 0.8 newtons per millimeter of the contact pressure distance and per centimeter of the sealing profile longitudinal extension.

3. The vehicle door as claimed in claim 2, wherein the sealing profile is provided such that the contact pressure force is provided over the contact pressure distance with a gradient of less than approximately 0.6 newtons per millimeter of the contact pressure distance and per centimeter of the sealing profile longitudinal extension.

4. The vehicle door as claimed in claim 3, wherein the sealing profile is provided such that the contact pressure force is provided over the contact pressure distance with a gradient of less than approximately 0.4 newtons per millimeter of the contact pressure distance and per centimeter of the sealing profile longitudinal extension.

5. The vehicle door as claimed in claim 1, wherein the contact pressure force constitutes a maximum of approximately 60% of the holding force of the fastening elements.

6. The vehicle door as claimed in claim 5, wherein the contact pressure force constitutes a maximum of approximately 40% of the holding force of the fastening elements.

7. The vehicle door as claimed in claim 6, wherein the contact pressure force constitutes a maximum of approximately 35% of the holding force of the fastening elements.

8. The vehicle door as claimed in claim 1, wherein the contact pressure distance is approximately 2 millimeters to approximately 30 millimeters, preferably approximately 4 millimeters to approximately 30 millimeters.

9. The vehicle door as claimed in claim 8, wherein the contact pressure distance is approximately 4 millimeters to approximately 30 millimeters.

10. The vehicle door as claimed in claim 9, wherein the contact pressure distance is approximately 6 millimeters to approximately 30 millimeters.

11. The vehicle door as claimed in claim 9, wherein the contact pressure distance is approximately 8 millimeters to approximately 30 millimeters.

12. The vehicle door as claimed in claim 1, wherein the sealing profile has at least one sealing lip.

13. The vehicle door as claimed in claim 1, wherein the sealing region is provided substantially in an outer region of the door lining, substantially entirely peripherally.

14. The vehicle door as claimed in claim 1, wherein the door lining has a separating element and the separating element divides an internal space of the vehicle door into a wet space facing the body and a dry space facing the door lining.

15. The vehicle door as claimed in claim 14, wherein the separating element is clamped between the body and the door lining inside the sealing region.

* * * * *